United States Patent [19]

Sara

[11] Patent Number: 4,837,722
[45] Date of Patent: Jun. 6, 1989

[54] DIGITAL HIGH SPEED 3-DIMENSIONAL INTERPOLATION MACHINE

[75] Inventor: Jason Sara, Delray Beach, Fla.

[73] Assignee: Massachusetts Institute of Technology, Cambridge, Mass.

[21] Appl. No.: 863,012

[22] Filed: May 14, 1986

[51] Int. Cl.$^4$ ............................................... G06F 7/38
[52] U.S. Cl. ...................................................... 364/723
[58] Field of Search ................... 364/723, 169, 474.31

[56] References Cited

U.S. PATENT DOCUMENTS

| | | | |
|---|---|---|---|
| 3,893,166 | 7/1975 | Pugsley . | |
| 4,282,578 | 8/1981 | Payne et al. | 364/723 |
| 4,497,035 | 1/1985 | Yabuuchi et al. | 364/723 |
| 4,511,989 | 4/1985 | Sahamoto | 364/723 |
| 4,536,853 | 8/1985 | Kawamoto | 364/723 |
| 4,566,075 | 1/1986 | Guttag | 364/759 |
| 4,602,545 | 7/1986 | Starkey | 364/723 |

Primary Examiner—Gary V. Harkcom
Assistant Examiner—Dale M. Shaw

[57] ABSTRACT

High speed interpolation machine for interpolating values in the transformation from one space to another. One important application is in the transformation from a transmission space to a display space for digital color television reproduction. The machine includes storage schemes for lookup table contents which permit parallel access to needed transformation coefficients during one clock cycle. The architecture results in a machine which can compute interpolation points quickly enough for real time digital television processing and requires a relatively small number of electronic components. The present invention will compute the interpolation function with approximately one eighth the memory requirements of a comparable high speed implementation. In one embodiment, the number of multiples is reduced and in another implementation, all of the multiplications can be eliminated. The transformation coefficients are stored in separate interpolation tables permitting parallel access.

7 Claims, 4 Drawing Sheets

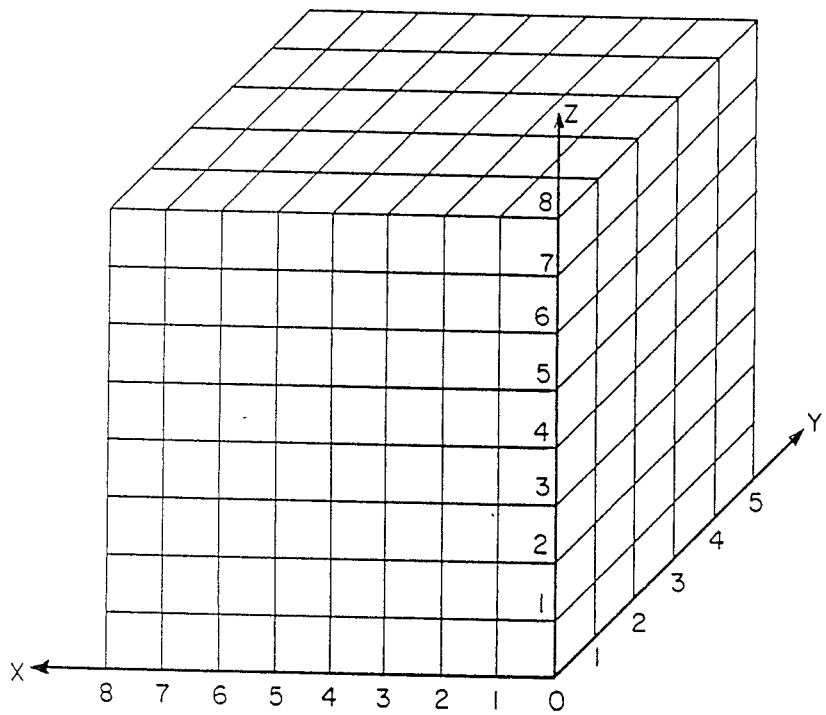
FIG. 1a
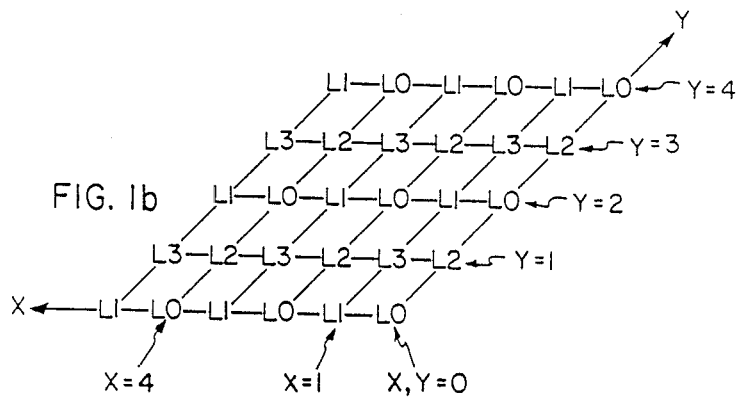
FIG. 1b
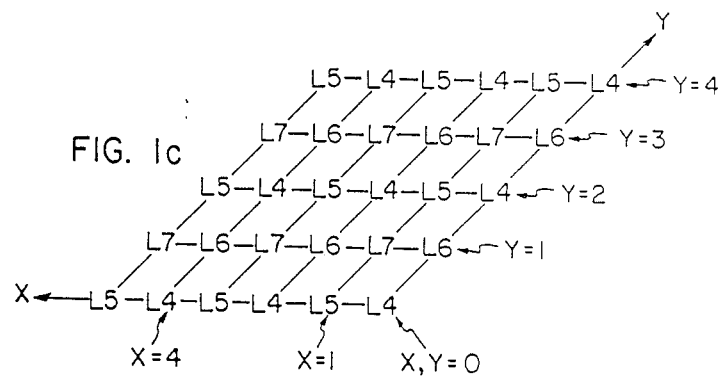
FIG. 1c
FIG. 1

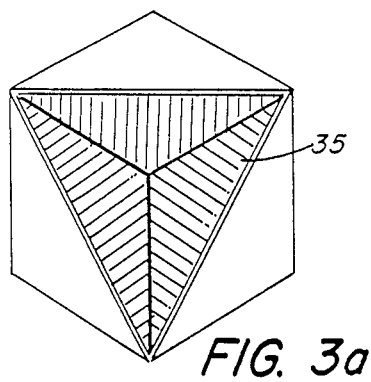
FIG. 3a
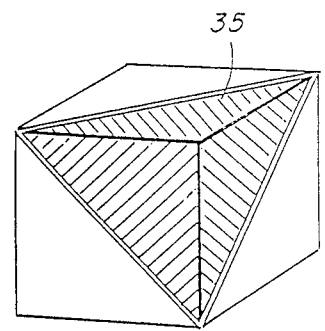
FIG. 3b
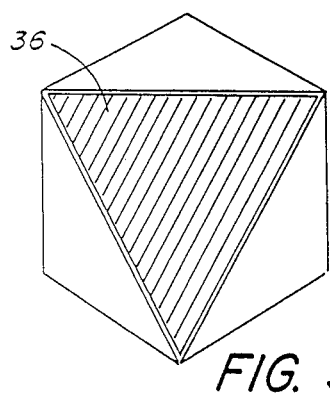
FIG. 3c
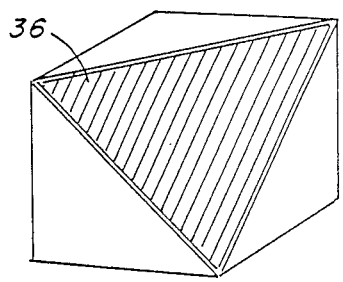
FIG. 3d
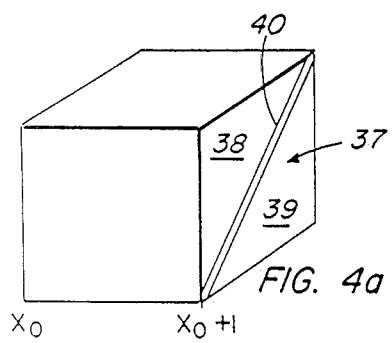
FIG. 4a
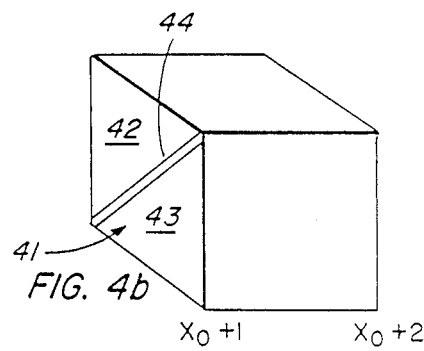
FIG. 4b
FIG. 4

DIGITAL HIGH SPEED 3-DIMENSIONAL INTERPOLATION MACHINE

BACKGROUND OF THE INVENTION

The present invention relates to interpolation machines and more particularly to a high speed digital interpolation machine useful in converting from one color space to another.

One method to calculate the value of a complicated function is by table look up. For example, trigonometric functions such as sines and cosines are tabulated. If the value of the function is not tabulated at the desired point, then it can be approximated by a linear interpolation between the two closest tabulated points. For a 3-dimensional function, a 3-dimensional interpolation is required.

One useful application of 3-dimensional interpolation is conversion of color space variables. For example, color television images are broadcast in a luminance-chrominance color space, but a television receiver requires red, green, blue (RGB) color signals. The conversion from luminance- chrominance space to RGB can be done by three interpolations (one for the red signal, one for green and one for blue). In conventional color televison receivers, the conversion is done by analog means.

With the digital method described here a much more complex relationship between transmission and display primaries is possible. Consequently, a reduction in transmission bandwidth and an improvement in image quality can be achieved.

The invention also relates to graphic arts quality printing system, in which images must be color corrected prior to printing.

The invention also relates to multidimensional function synthesis. A function of 3 variables is tabulated at discrete values of the 3 range variables. The value of the function at non-tabulated points can be synthesized by interpolation.

Many digital techniques are known for performing interpolations. For a 3-dimensional color space, two types of interpolations are commonly used to approximate the continuous mapping function, namely, trilinear interpolation and 3-dimensional piecewise linear interpolation. For trilinear interpolation, a linear interpolation is done for each dimension of the color space. Let the range of the interpolating function be specified by the coordinates X, Y and Z. Let the value of the function, F, be tabulated at integer values of X, Y and Z. The trilinear interpolation function can be computed by the summation:

$$F(X,Y,Z) = \qquad (1)$$
$$F(X_0,Y_0,Z_0) \times (X_0 + 1 - X)(Y_0 + 1 - Y)(Z_0 + 1 - Z) +$$
$$F(X_0 + 1,Y_0,Z_0) \times (X - X_0)(Y_0 + 1 - Y)(Z_0 + 1 - Z) +$$
$$F(X_0,Y_0 + 1,Z_0) \times (X_0 + 1 - X)(Y - Y_0)(Z_0 + 1 - Z) +$$
$$F(X_0 + 1,Y_0 + 1,Z_0) \times (X - X_0)(Y - Y_0)(Z_0 + 1 - Z) +$$
$$F(X_0,Y_0,Z_0 + 1) \times (X_0 + 1 - X)(Y_0 + 1 - Y)(Z - Z_0) +$$
$$F(X_0 + 1,Y_0,Z_0 + 1) \times (X - X_0)(Y_0 + 1 - Y)(Z - Z_0) +$$
$$F(X_0,Y_0 + 1,Z_0 + 1) \times (X_0 + 1 - X)(Y - Y_0)(Z - Z_0) +$$
$$F(X_0 + 1,Y_0 + 1,Z_0 + 1) \times (X - X_0)(Y - Y_0)(Z - Z_0)$$

-continued where $X_0, Y_0, Z_0$ are the greatest integers less than X,Y,Z.

This is the weighted sum form of trilinear interpolation. The interpolated value is a weighted sum of the values at the eight corner points of a cube in the XYZ space. Though the interpolation is linear in each dimension, trilinear inrterpolation fits a hyperbolic surface between the data points.

For piecewise linear interpolation, the model of the data space is of the form:

$$F(X,Y,Z) = a_x X + a_y y + a_z Z + a_0 \qquad (2)$$

It is necessary to determine the constants $a_x$, $a_y$, $a_z$ and $a_0$ for all points in the space. Since there are four constants, a minimum of four samples of the function F are required. For 3-dimensional linear interpolation, the resulting cubes in the 3-dimensional space can be divided into five tetrahedrons per cube. The parameters of the linear equations are constant for each tetrahedron of the cube.

It is often desirable or necessary to transform color space data very rapidly. For example, for real-time updates of a 30 Hz color TV display from a 512×512 frame buffer, a new color point must be calculated approximately every 100 ns. For such high throughput rates, it is usually necessary to implement the color space transformation in hardware.

It is therefore a primary object of the present invention to provide transformation hardware which performs the interpolation very efficiently.

Yet another object of the invention is interpolation hardware which can update color television images in real time.

Still another object of the invention is interpolation hardware which is four to eight times faster than known digital interpolation techniques, or requires ¼ to ⅛ the memory of other schemes.

SUMMARY OF THE INVENTION

These and other objects of the invention are achieved utilizing an architecture and hardware in which the color space transformation variables are stored in separate lookup tables so that the necessary points for the interpolation calculation may be accessed in parallel in one clock cycle. For a linear interpolation, four RAMs are required; for a trilinear interpolation, eight RAMs are required. In the linear interpolation architecture, all multiplications are eliminated.

BRIEF DESCRIPTION OF THE DRAWING

The present invention will be understood better with reference to the following drawing of which:

FIGS. 1a, 1b and 1c are diagrams showing a storage scheme which permits parallel access in a trilinear interpolation;

FIGS. 3a–3d are diagrams illustrating one of the four corner tetrahedrons and the interior tetrahedron;

FIGS. 4a–4b are diagrams illustrating why the tetrahedral subdivision should be alternated;

DESCRIPTION OF THE PREFERRED EMBODIMENT

Figure 2:
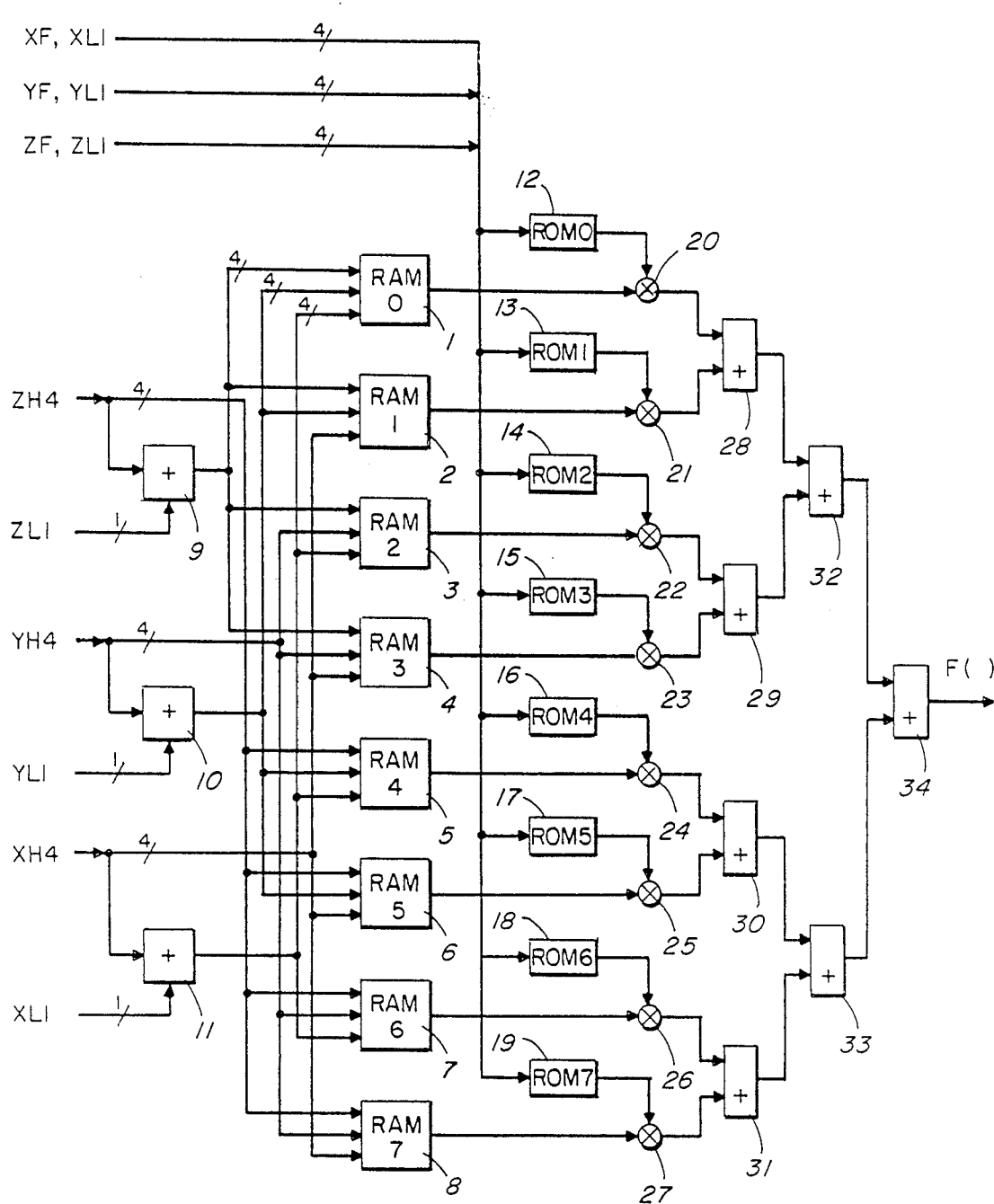
FIG. 2 is a diagram showing a high speed architecture for trilinear interpolation.

The weighted average form of trilinear interpolation set forth in Equation 1 is one method to implement a smooth interpolation function. Unfortunately, eight table lookups must be done, one for each corner of the color space cube. Since state of the art high speed memories have access times on the order of 50 ns, it is not feasible to achieve a throughput time as low as 100 ns per interpolated point which would be required for real time updates of color television images. According to the form of equation 1, 3 multiplies must be performed for each corner of the cube, for a total of 24 multiplies per interpolated color space variable. The present hardware eliminates the problems associated both with the table lookup requirements and the number of multiplies. In a trilinear interpolation scheme described below, an architecture is described which permits reading all eight corner points of the cube in a single memory cycle. The number of multiplies is reduced to eight by using a table lookup method. In this scheme, however, seven additions per point are still required. A tetrahedral linear interpolation method reduces the number of additions from 7 to 3, and all of the multiplications are eliminated.

The interpolating function is tabulated at discrete increments in the range variables X,Y,Z. For 32 increments of X, 32 increments of Y and 32 increments of Z the complete lookup table would contain 32,768 samples. More or fewer increments of each range variable may be used in the interpolation apparatus, the number 32 being only one example. Each range variable may be scaled and otherwise transformed independently of the other two, so that the lookup table contains values at unity increments of the transformed range variables. This makes the interpolation method insensitive to the physical units of the interpolating function. FIGS. 1a–1c show how the lookup table can be represented as 8 independently addressable sub-lookup tables, each sub-lookup table containing one-eighth the points of the complete lookup table.

FIG. 1a shows the entire range of the interpolating function. This is a cube in a 3-dimensional space. The Cartesian coordinates X, Y and Z span the space. In one embodiment of the interpolator, each of X,Y,Z is represented by a fixed point number consisting of a 5 bit integer field and 3 bit fractional field. The minimum value of each fixed point variable is zero, but the maximum value is 31 instead of 31.875. If this limitation were not imposed then 33 samples for each dimension of the lookup table would be required.

The value of the interpolating function, F, at integral values of X, Y and Z is stored in a lookup table. This lookup table is divided into 8 distinct and independently addressable sub-lookup tables which will be called L0, L1, L2, L3, L4, L5, L6, and L7. A tabulated point (at integral values of X, Y, and Z) will be stored in exactly one of these sub-lookup tables.

FIGS. 1b and 1c illustrate in which sub-lookup table a tabulated point is stored. For even values of Z the storage scheme in FIG. 1b is used and for odd values of Z the storage scheme in FIG. 1c is used.

It can be verified by enumeration that for every sub-cube in the 3-dimensional X,Y,Z range each of the 8 tabulated points required for trilinear interpolation is located in a different sub-lookup table.

A tabulated value can be uniquely specified by the most significant 5 bits (integer part) of each of the 3 range variables (X,Y,Z). If a single digital memory, such as a RAM or ROM, was used to store the entire lookup table then the lookup table could be addressed with a 15 bit number consisting of the 5 most significant bits of each range variable concatenated together. The data read from the lookup table would then be the tabulated value at the desired point.

An analogous scheme can be used to retrieve all 8 interpolating points required for a trilinear interpolation using 8 sub-lookup tables. The addressing scheme is more complex due to the "alternating" storage scheme shown in FIGS. 1b and 1c. For example, when X=0 and Y=0 and Z increases from 0 to 31 the sub-lookup table in which the interpolating function is stored alternates between L0 and L4. The least significant bit of the integer part of Z can be used to locate the correct sub-lookup table. When this bit is 0 the tabulated value is in L0 and when this bit is 1 the tabulated value is in L4.

Call the fractional part of X,Y,Z,XF,YF,ZF. Each of these is a 3 bit number. Call the integer part of X,Y,Z,XI, YI,ZI. Call the least significant bit of the integer parts of X,Y,Z, XL1, YL1, ZL1 and call the 4 most significant bits of the integer parts of X,Y,Z, XH4, YH4, ZH4. Call the integer part of the coordinates at which the interpolating function is to be computed $X_0$, $Y_0$, $Z_0$. Then the tabulated points for the trilinear interpolation are located in the sub-lookup tables indicated in Table 1.

TABLE 1

| XL1 | YL1 | ZL1 | $F(X_0, Y_0, Z_0)$ | $F(X_0 + 1, Y_0, Z_0)$ | $F(X, Y_0 + 1, Z_0)$ | $F(X_0 + 1, Y_0 + 1, Z_0)$ | $F(X_0, Y_0, Z_0 + 1)$ | $F(X_0 + 1, Y_0, Z_0 + 1)$ | $F(X_0, Y_0 + 1, Z_0 + 1)$ | $F(X_0 + 1, Y_0 + 1, Z_0 + 1)$ |
|---|---|---|---|---|---|---|---|---|---|---|
| 0 | 0 | 0 | L0 | L1 | L2 | L3 | L4 | L5 | L6 | L7 |
| 1 | 0 | 0 | L1 | L0 | L3 | L2 | L5 | L4 | L7 | L6 |
| 0 | 1 | 0 | L2 | L3 | L0 | L1 | L6 | L7 | L4 | L5 |
| 1 | 1 | 0 | L3 | L2 | L1 | L0 | L7 | L6 | L5 | L4 |
| 0 | 0 | 1 | L4 | L5 | L6 | L7 | L0 | L1 | L2 | L3 |
| 1 | 0 | 1 | L5 | L4 | L7 | L6 | L1 | L0 | L3 | L2 |
| 0 | 1 | 1 | L6 | L7 | L4 | L5 | L2 | L3 | L0 | L1 |
| 1 | 1 | 1 | L7 | L6 | L5 | L4 | L3 | L2 | L1 | L0 |

According to Equation 1, the trilinearly interpolated value is the sum of the lookup table contents times "weighting coefficients". These weighting coefficients depend only on the fractional parts of X,Y,Z. Therefore, these coefficients can be stored in read only memories, ROMs, which are addressed by XF, YF and ZF. In one implementation, the mapping from tabulated lookup table value to sub-lookup table, shown in Table 1, can be incorporated into these ROMs if 3 additional address bits (XL1, YL1, ZL1) are used. Equation 1 can now be rewritten in terms of sub-lookup tables and ROMs as:

$$F(X,Y,Z) = \quad (3)$$

$$L0(XI,YI,ZI) \times ROM0(XF,YF,ZF,XL1,YL1,ZL1) +$$

$$L1(XI,YI,ZI) \times ROM1(XF,YF,ZF,XL1,YL1,ZL1) + \ldots +$$

$$L7(XI,YI,ZI) \times ROM7(XF,YF,ZF,XL1,YL1,ZL1)$$

The functions ROM0 through ROM7 can be implemented with read only memories whose contents can be determined using Equation 1 and Table 1. Each ROM will have a 12 bit address space.

The functions L0 through L7 are implemented by table lookups of the 8 sub-lookup tables. Note that the variables XI, YI, ZI cannot be used to directly find the desired tabulated values. The total bits in the concatenation of XI, YI, ZI is 15, but each sub-lookup table has a 12 bit address space. If we denote each sub-lookup table by RAM0 through RAM7 then it can be verified by enumeration that the relationship in equation 4 below yields the desired sub-lookup table contents:

$$L0(XI,YI,ZI) = RAM0(XH4 + XL1, YH4 + YL1, ZH4 + ZL1) \quad (4)$$

$$L1(XI,YI,ZI) = RAM1(XH4, YH4 + YL1, ZH4 + ZL1)$$

$$L2(XI,YI,ZI) = RAM2(XH4 + XL1, YH4, ZH4 + ZL1)$$

$$L3(XI,YI,ZI) = RAM3(XH4, YH4, ZH4 + ZL1)$$

$$L4(XI,YI,ZI) = RAM4(XH4 + YL1, YH4 + YL1, ZH4)$$

$$L5(XI,YI,ZI) = RAM5(XH4, YH4 + YL1, ZH4)$$

$$L6(XI,YI,ZI) = RAM6(XH4 + XL1, YH4, ZH4)$$

$$L7(XI,YI,ZI) = RAM7(XH4, YH4, ZH4)$$

An architecture using the 8 sub-lookup table method is shown in FIG. 2. Items 1 through 8 are the 8 storage devices containing the sub-lookup tables denoted as RAM0 through RAM7 in Equation 4. Items 9 through 11 are 4 bit adders which implement the RAM addressing of Equation 4. Items 12 through 19 are the coefficient ROMs ROM0 through ROM7 of Equation 3. Items 20 through 27 are multipliers for the products in Equation 4. Items 28 through 34 are the adders required for the summation in Equation 3.

A linear interpolation scheme will now be discussed in conjunction with FIGS. 3–6. FIGS. 3a–3d illustrate one method to subdivide a cube into 5 tetrahedrons. There are four "corner" tetrahedrons such as the tetrahedron 35 shown in different perspective views in FIGS. 3a and 3b and one "interior" tetrahedron 36 shown in different perspective views in FIGS. 3c and 3d. Let $X_0$, $Y_0$, $Z_0$ be integers where the interpolating function is tabulated.

Corner tetrahedron 1 has vertices at:

$(X_0,Y_0,Z_0),(X_0+1,Y_0,Z_0),(X_0,Y_0+1,Z_0),(X_0,Y_0,Z_0+1)$

Corner tetrahedron 2 has vertices at:

$(X_0+1,Y_0+1,Z_0),(X_0,Y_0+1,Z_0),(X_0+1,Y_0,Z_0),(X_0+1,Y_0+1,Z_0+1)$

Corner tetrahedron 3 has vertices at:

$(X_0+1,Y_0,Z_0+1),(X_0,Y_0,Z_0+1),(X_0+1,Y_0+1,Z_0+1),(X_0+1,Y_0,Z_0)$

Corner tetrahedron 4 has vertices at:

$(X_0,Y_0+1,Z_0+1),(X_0+1,Y_0+1,Z_0+1),(X_0,Y_0,Z_0+1),(X_0,Y_0+1,Z_0)$

Interior tetrahedron 5 has vertices at:

$(X_0+1,Y_0+1,Z_0+1),(X_0,Y_0,Z_0+1),(X_0,Y_0+1,Z_0),(X_0+1,Y_0,Z_0)$

The interpolating function within tetrahedron 1 is:

$$F(X,Y,Z) = \quad (6)$$

$$F(X_0,Y_0,Z_0) \times [1 - (X - X_0) - (Y - Y_0) - (Z - Z_0)] +$$

$$F(X_0 + 1, Y_0, Z_0) \times X - X_0 + F(X_0, Y_0 + 1, Z_0) \times Y - Y_0 +$$

$$F(X_0, Y_0, Z_0 + 1) \times Z - Z_0$$

Tetrahedrons 2 through 4 are isomorphic to tetrahedron 1, and have similar interpolating functions.

The interpolating function within tetrahedron 5 is:

$$F(X,Y,Z) = F(X_0 + 1, Y_0 + 1, Z_0 + 1) \times \quad (7)$$

$$\frac{(X - X_0) + (Y - Y_0) + (Z - Z_0) - 1}{2} + F(X_0, Y_0, Z_0 + 1) \times$$

$$\frac{1 - (X - X_0) - (Y - Y_0) + (Z - Z_0)}{2} + F(X_0, Y_0 + 1, Z_0) \times$$

$$\frac{1 - (X - X_0) + (Y - Y_0) - (Z - Z_0)}{2} + F(X_0 + 1, Y_0, Z_0) \times$$

$$\frac{1 + (X - X_0) - (Y - Y_0) - (Z - Z_0)}{2}$$

By rearranging terms it can be verified that Equations 6 and 7 are linear functions of the range variables X,Y,Z within each tetrahedron and satisfy Equation 2.

Within any cube each vertex has an "opposite" vertex which is the vertex of the cube which is farthest from it. While there are many possible methods to subdivide a cube into tetrahedrons, the method of FIG. 3, has the important property that if a vertex is within a tetrahedron its opposite vertex does not intersect the tetrahedron. This can be verified by enumeration with Equation 5.

Consequently, the 8 sub-lookup tables of the trilinear interpolation method can be combined into 4 sub-lookup tables as indicated below:

TABLE 2

| New Sub-Lookup Table | Combination of Sub-Lookup Tables |
| --- | --- |
| LL0 | 0 and 7 |
| LL1 | 1 and 6 |
| LL2 | 2 and 5 |
| LL3 | 3 and 4 |

One objective of the high speed interpolator is to construct an interpolating function which is continuous. Due to the linearity of the interpolating function within each tetrahedron, the interpolating function will be continuous across tetrahedral boundaries within a particular cube.

FIG. 4 shows that if the same tetrahedral subdivisions are used for every sub-cube then the interpolating function can be discontinuous when crossing from one sub-cube into the next adjacent sub-cube. FIG. 4a illustrates one surface 37 where this discontinuity can occur. For the cube beginning at $X_0$ and ending at $X_0+1$, the surface at $X_0+1$ has 2 separate interpolating regions 38 and 39 corresponding to 2 of the tetrahedral subdivisions of the cube. These regions are separated by a diagonal 40 of the surface. For the cube beginning at $X_0+1$ and ending at $X_0+2$ (FIG. 4b), the surface 41 has 2 separate interpolating regions, items 42 and 43. These regions are separated by a diagonal 44 of the surface which is different from diagonal 40.

Define a second subdivision of the cube by replacing each vertex in Equation 5 by its opposite vertex. If the tetrahedral subdivision is alternated between adjacent cubes so that one cube has the 5 tetrahedral subdivisions of Equation 5 and all adjacent cubes have the "opposite" subdivision then the discontinuity of FIG. 4 does not occur.

Figure 5:
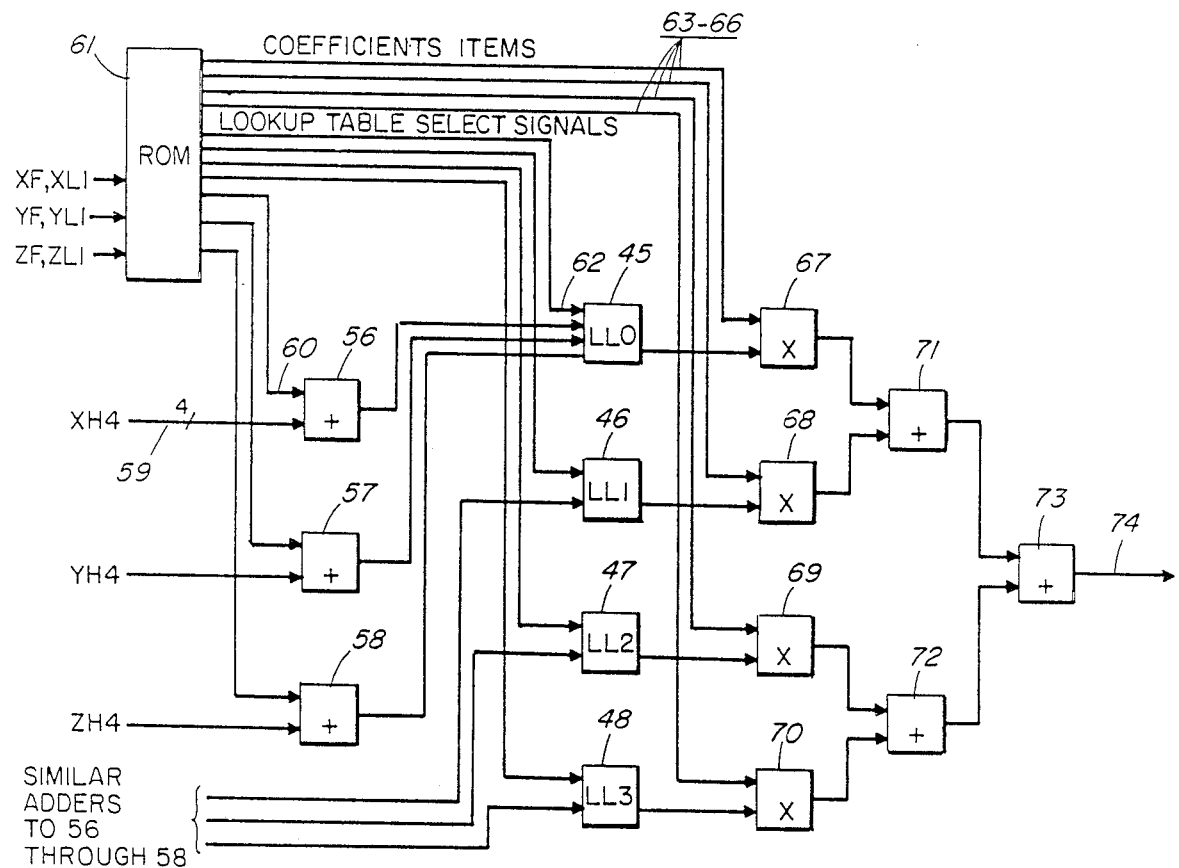
FIG. 5 is a complete architecture for linear interpolation.

In FIG. 5 is shown the linear interpolator. The addressing of the 4 sub-lookup tables is similar to the trilinear interpolator of FIG. 2. Items 45-48 are the sub-lookup tables LL0 through LL3. For LL0 we must select either point L0 or point L7 of the trilinear interpolator.

Figure 6:
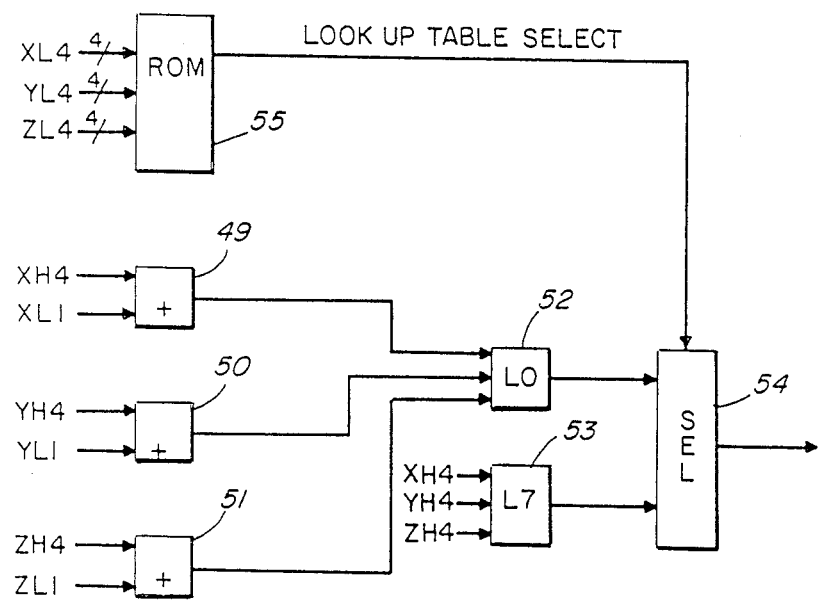
FIG. 6 shows how the linear interpolation architecture is derived from the trilinear interpolation architecture.

FIG. 6 shows how this could be done with 2 lookup table RAMs and a selector. FIG. 6 items 49-51 are 4 bit adders and perform the same functions as items 9,10,11 respectively in FIG. 2. Items 52 and 53 (L0, L7) are the sub-lookup tables RAM0 and RAM7 respectively of FIG. 2. A seclector 54 is then used to select the correct value for LL0. The decision to select L0 or L7 will depend only on the fractional components of X,Y,Z (which determine the interpolating tetrahedron) and XL1, YL1, ZL1 (which determine the alternating property of the tetrahedral subdivisions and the alternating properties of each cube as per Table 1). A ROM 55, with a 12 bit address space, can therefore be used to select L0 or L7. The 1 bit output of the ROM 55 drives the selector to generate the final sub-lookup table value LL0. The values of LL1, LL2, and LL3 can be similarly computed.

Returning to FIG. 5, the analogous function is performed by a single lookup table for LL0. Items 56-58 are 4 bit adders. Each adder has a 4 bit input and a 1 bit input. Item 59 is the 4 bit input, XH4, for adder 56. Item 60 is a 1 bit input generated from a read only memory 61. When L0 is to be selected, item 60 will have the value of XL1 and adder 56 will perform the same function as adder 49 in FIG. 6. Conversely, when L7 is to be selected, item 60 will have a value of 0 and adder 56 will have no effect on the interpolation. A similar 1 bit addend is generated for the remaining 2 adders 50 and 51 for LL0. The ROM 61 also generates a 1 bit select signal, item 62. When L0 is to be selected signal 62 is 0 and when L7 is to be selected signal 62 is 1. A similar circuit is used for the other 3 sub-lookup tables, items 46, 47 and 48.

Referring back to Equations 6 and 7 it can be verified that the weighting factors, multiplying each sub-lookup table value also only depend on the addresses of ROM 61. Furthermore, it can be verified by enumeration that the weighting factor for each sub-lookup table is a positive 4 bit fractional number whose minimum value is 0 and maximum value is 1. [Note that a value of 15/16 cannot occur. The codeword for 15/16 can be reserved to represent unity.]

ROM 61 therefore generates items 63 through 66 which are coefficients to be multiplied by sub-lookup table LL0 through LL4. When the lookup tables LL0 through LL4 contain 8 bit values, the product of the 8 bit sub-lookup table values and 4 bit coefficients can be computed with ROMs 67-70. Adders 71-73 perform the summations of equations 6 and 7. The final interpolated value is item 74.

It is thus seen that the objects of this invention have been achieved in that there has been described high speed digital interpolation techniques capable of real time television image updates. In the trilinear interpolation aspect, the number of multiples is reduced to 8 by using a table look up method. This technique requires 7 additions per point. In the tetrahedral linear interpolation method of the present invention, the number of additions is reduced from 7 to 3 and all of the multiplications are eliminated.

It is recognized that modifications and variations of the present invention will occur to those skilled in the art and it is intended that all such modifications and variations be included within the scope of the appended claims.

What is claimed is:

1. An interpolation apparatus comprising: a total interpolation table comprising a plurality of interpolation subtables, each subtable storing a fraction of the total interpolation table;
    a plurality of address generation circuits for the interpolation subtables;
    a plurality of coefficient generation circuits;
    and circuitry to combine the coefficients and interpolation table values in parallel into a 3-dimensional interpolating function.

2. The interpolation apparatus of claim 1 in which RAMs or ROMs are used to store the interpolation table and further including a plurality of coefficient RAMs or ROMs, one for each interpolation table, for storing the output of the coefficient generation circuits.

3. The apparatus of claim 1 for trilinear interpolation using eight interpolation tables.

4. The apparatus of claim 1 for linear interpolation using four interpolation tables.

5. The apparatus of claim 4 wherein the circuitry to combine the coefficients and interpolation table values generates tetrahedral subdivisions which alternate in adjacent subcubes of the interpolating range to yield a smooth interpolating function.

6. The apparatus of claim 4 involving only lookup table operations.

7. The apparatus of claim 1 in which the total interpolation table is represented by $2^{M+N+O}$ samples of the interpolating function, wherein $2^M 2^N 2^O$ are samples for the 3 dimensions of the domain variables where M, N, and O are arbitrary integers.

* * * * *

UNITED STATES PATENT AND TRADEMARK OFFICE
CERTIFICATE OF CORRECTION

PATENT NO. : 4,837,722

DATED : June 6, 1989

INVENTOR(S) : Jason Sara

It is certified that error appears in the above-identified patent and that said Letters Patent is hereby corrected as shown below:

Title page, Item (56) References Cited

Change "4,511,989  4/1985  Sahamoto,..................364/723" to
       --4,511,989  4/1985  Sakamoto..................364/723--.

Column 1, line 35, change "system," to --systems,--.
Column 5, line 56, insert --(5)-- in right margin.
Column 8, change "table" to --tables--.

Signed and Sealed this

Thirteenth Day of March, 1990

Attest:

JEFFREY M. SAMUELS

*Attesting Officer*    *Acting Commissioner of Patents and Trademarks*